United States Patent [19]
Baker et al.

[11] Patent Number: 5,231,254
[45] Date of Patent: Jul. 27, 1993

[54] AUTOMOBILE TRANSMISSION MODE SENSING APPARATUS

[75] Inventors: Gary A. Baker, North Scituate, R.I.; Amedeo Salvatore, Naples, Italy

[73] Assignee: Texas Instruments Incorporated, Dallas, Tex.

[21] Appl. No.: 805,215

[22] Filed: Dec. 11, 1991

[51] Int. Cl.$^5$ .............................................. H01H 3/16
[52] U.S. Cl. .............................. 200/61.91; 200/61.88
[58] Field of Search ............... 200/16 C, 16 D, 61.85, 200/61.86, 61.88, 61.89, 61.91

[56] References Cited

U.S. PATENT DOCUMENTS

| | | | |
|---|---|---|---|
| 3,614,351 | 10/1971 | Wojcik | 200/61.86 |
| 3,632,909 | 1/1972 | Rowley | 200/16 D |
| 3,783,204 | 1/1974 | Kennedy et al. | 200/16 D X |
| 3,857,000 | 12/1974 | Boulanger | 200/16 D |
| 4,126,153 | 11/1978 | Raab | 200/61.86 X |
| 5,015,808 | 5/1991 | Czarn et al. | 200/83 P |
| 5,064,975 | 11/1991 | Boucher | 200/61.88 |

*Primary Examiner*—J. R. Scott
*Attorney, Agent, or Firm*—Russell E. Baumann; Richard L. Donaldson; René E. Grossman

[57] ABSTRACT

A switch is shown mounted inside the housing of an automatic transmission of a motor vehicle with a sliding movable electrical contact coupled to the manual valve of the transmission to provide an indication of the position of the manual gear selector. An electrical resistive network is interconnected with stationary contact segments to provide electronic signals to a powertrain electronic controller of the automobile corresponding to the linear position of the manual valve. Pressure switches are coupled to selected hydraulic circuits and electrically interconnected to the resistive network.

24 Claims, 11 Drawing Sheets

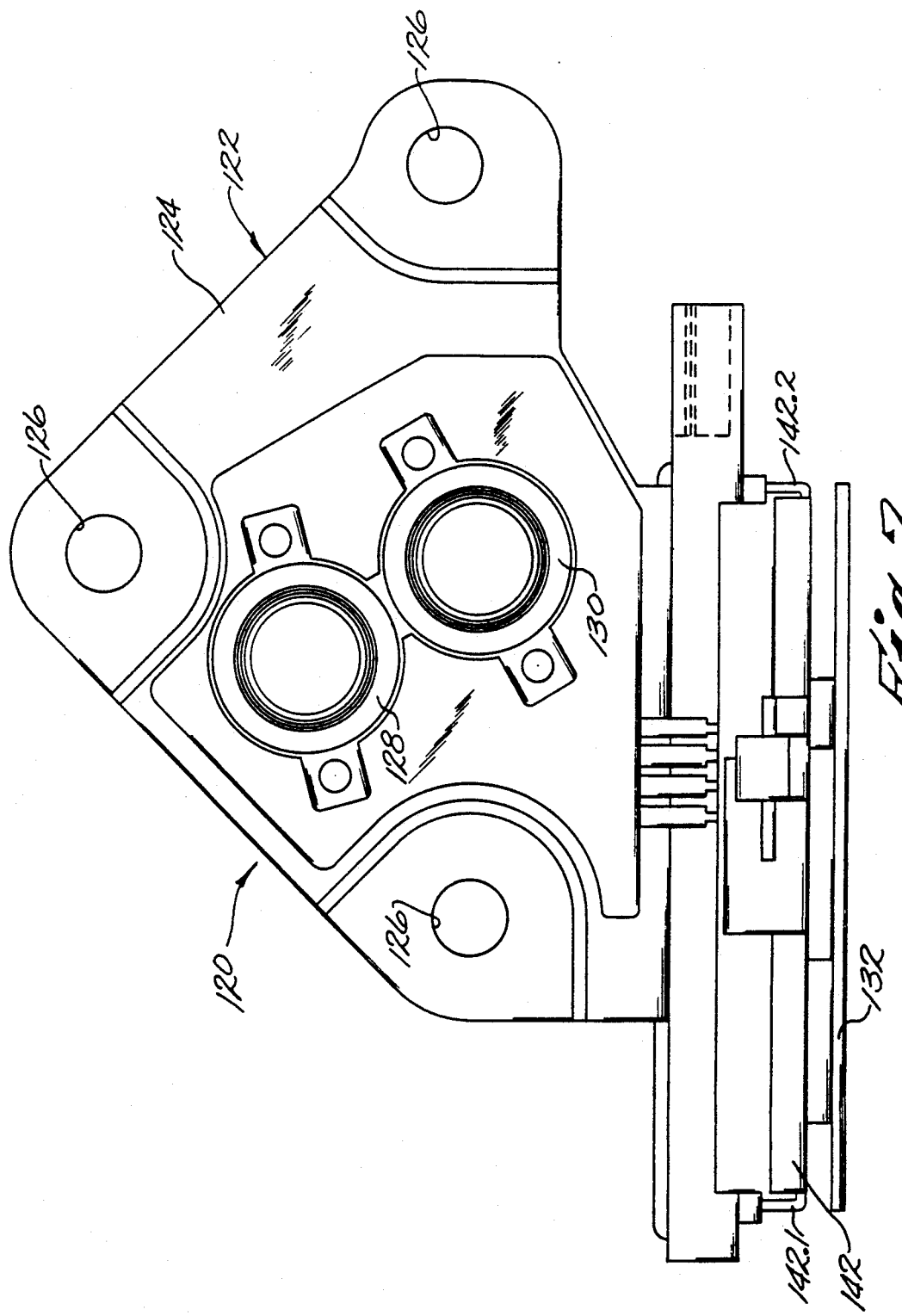

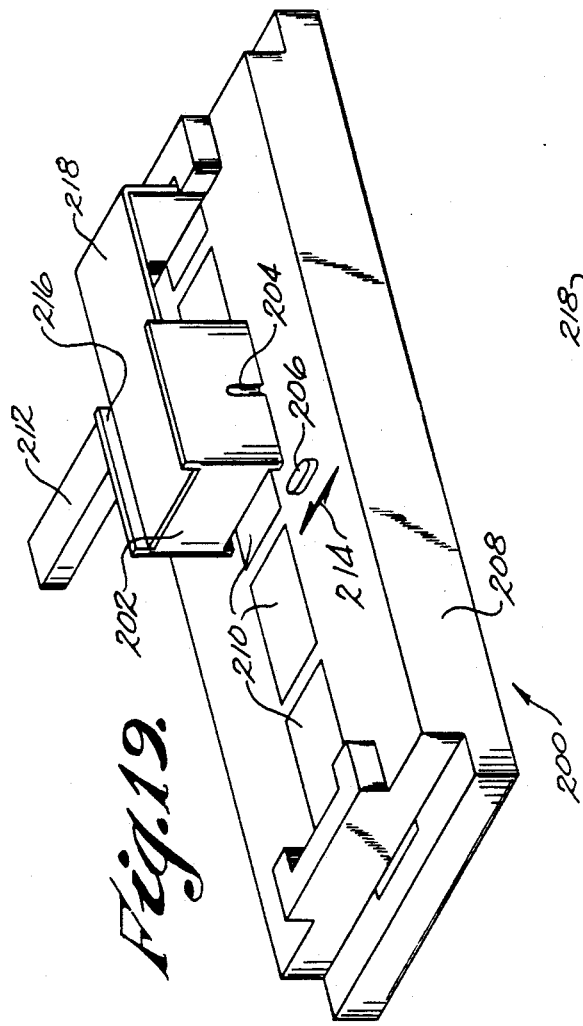
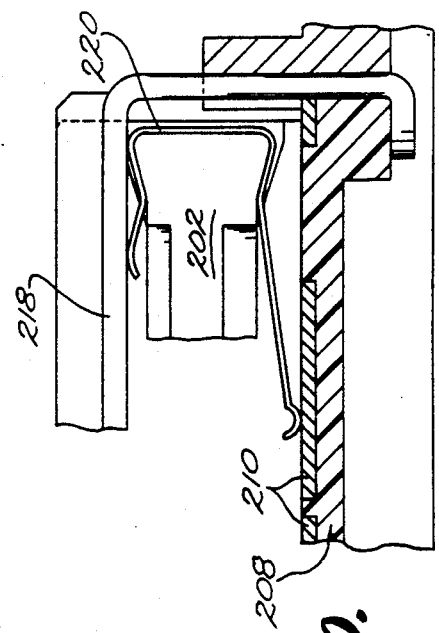
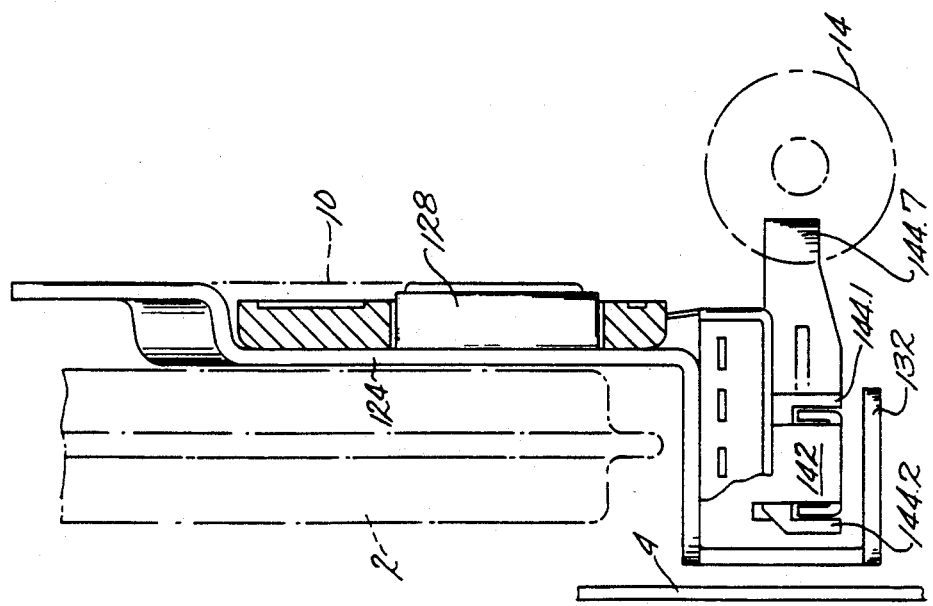

1

AUTOMOBILE TRANSMISSION MODE SENSING APPARATUS

FIELD OF THE INVENTION

This invention relates generally to vehicular transmissions and more particularly to means for sensing the position of the manual valve of an automatic transmission which determines which mode the transmission is in at a given time.

BACKGROUND OF THE INVENTION

It is conventional to mount a rotary switch on the transmission housing externally thereof to receive mechanical gear selection inputs from the driver through linkages and output gear selections to a decoder module and the transmission electronic control unit via electronic signals. The switch includes a quadrant with a selected number of copper contact segments disposed thereon with each segment providing an output to the decoder module. The manual valve is mechanically coupled to a plate having indexing detents pivotably mounted on a shaft. The shaft extends through the transmission housing wall and a switch bar is fixedly attached to the shaft so that when a driver selects a gear, the switch bar moves across the quadrant to a predetermined position to contact one of the copper contact segments. The electronic control may monitor the gear position along with other inputs relating to such things as throttle position, output shaft speed, engine speed, engine load and so on.

Although this switch system is in wide use it suffers from certain limitations and disadvantages. For example, locating the switch outside the transmission housing removed from the manual valve results in an undesirable tolerance build up involving all the linking elements. Further, the switch is locating in a splash zone, particularly when used with four wheel drives, necessitating the provision of sealing means to prevent entry of water. The extra cost for such sealing means including venting tubes and the like adds significantly to the cost of the system.

It is therefore an object of the present invention to provide a reliable, low cost manual valve position indicator that is free of the above disadvantages of the prior art switch system mounted exteriorly of the transmission housing. Another object is the provision of a position indicator which also generates additional information for the electronic controller, particularly relating to when sufficient pressure has been applied to specific hydraulic circuits indicating if clutches are capable of transmitting engine torque.

SUMMARY OF THE INVENTION

Briefly, in accordance with the invention, a switch system comprises a bracket having a first portion attached to the transmission housing in the interior thereof intermediate the manual valve and the transmission oil filter and a second portion extending from the first portion at an angle of generally 90°. The first bracket portion includes pressure switches adapted to be coupled to selected hydraulic passages and electrical circuit traces leading to an overmolded circuit on the second bracket portion. The second bracket portion also includes a plurality of stationary contact segments and a movable contact means adapted to slide into and out of engagement with selected contact segments. These contacts are interconnected by selected resistors. The movable contact means engages a slot or recess in the manual valve so that the position of the movable contact means accurately tracks the manual valve position. According to a feature of the invention the pressure switch outputs may be incorporated into a resistor network with the manual valve position sensor. The system provides a voltage output to the powertrain electronic controller which interprets the output as a transmission event, for example gear selection and hydraulic pressure application and release.

According to a first embodiment of the invention a bridging contact member is spring biased against a support in which both the common contact and the plurality of contact segments are mounted.

According to a second embodiment a more compact assembly is provided by a slider which mounts a generally U-shaped contact spring with the bight portion of the U configuration formed into a pair of sliding contacts adapted to ride on stationary contact segments on a circuit board while the distal free ends of the spring on the opposite side of the slider are adapted to engage an electrically conductive common bar.

According to another embodiment of the invention the movable contact means comprises a metallic bar on the top of a slider which functions both as a guide for movement of the slider as well as the common contact. A generally U-shaped spring which has one arm extending over the slider and a second extending under the slider interconnects the common or top contact with a selected contact segment on the support.

According to another feature of the invention the slider is provided with a reference and detent mechanism which is used on assembly or during servicing to align the contacts before tightening the bracket mounting means.

BRIEF DESCRIPTION OF THE DRAWINGS

FIG. 1b is a top plan view of an electrical spring contact which is received on the movable contact slider shown in FIG. 1a;

FIG. 7 is a front elevational view of sensing apparatus made in accordance with a second embodiment of the invention;

FIG. 18 is a side view of the FIG. 7 sensing apparatus;

FIG. 19 is a perspective view of a slider and portion of a bracket of another embodiment of the invention; and FIG. 20 is a cross sectional view of a portion of the FIG. 19 embodiment shown with a contact spring mounted on the slider.

DETAILED DESCRIPTION OF PREFERRED EMBODIMENTS

Figure 1:
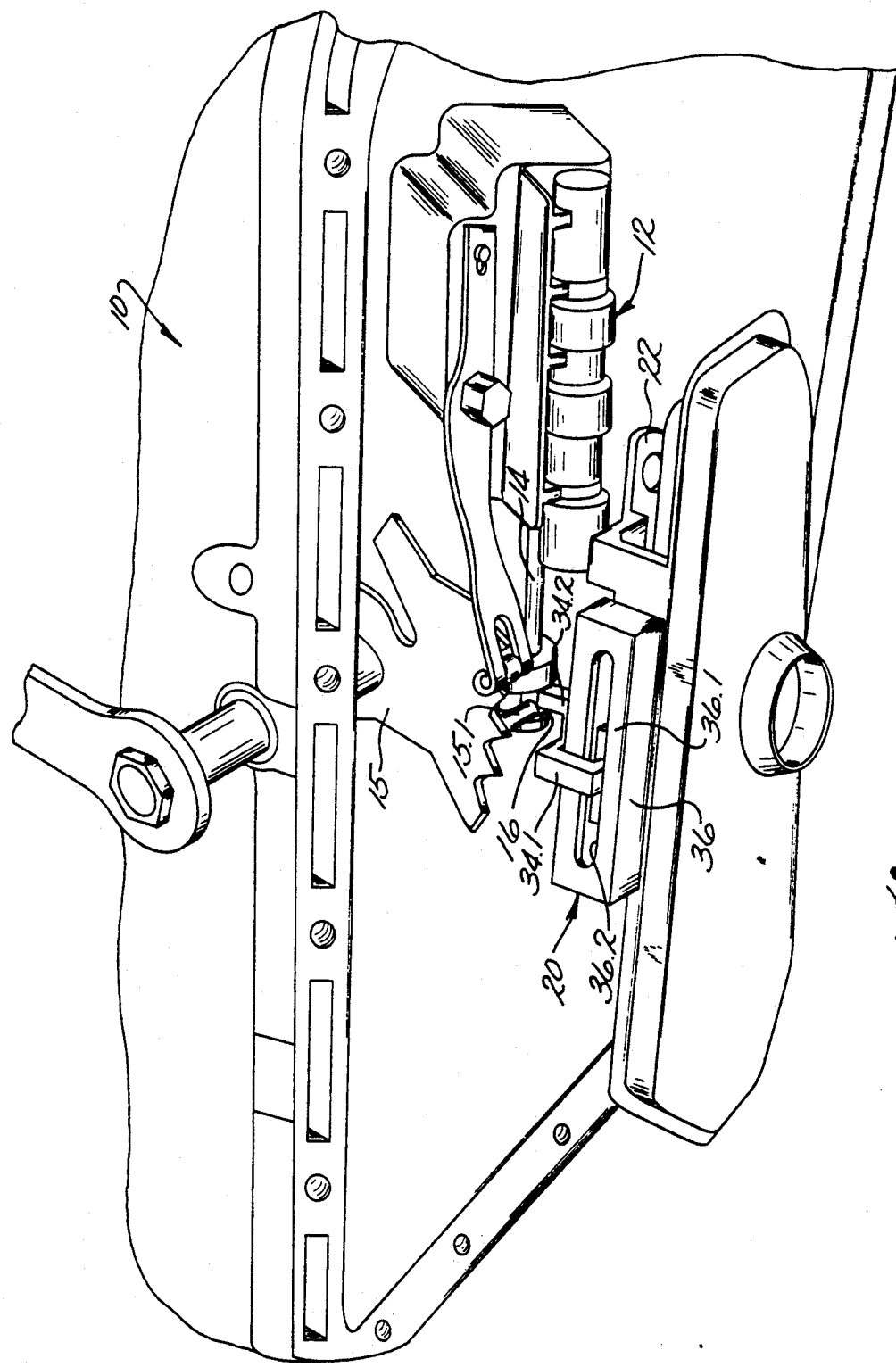
FIG. 1 is a perspective view of a portion of an automobile transmission housing with the oil pan removed showing the manual valve housing and the sensing apparatus made in accordance with a first embodiment of the invention.
Figure 1A:
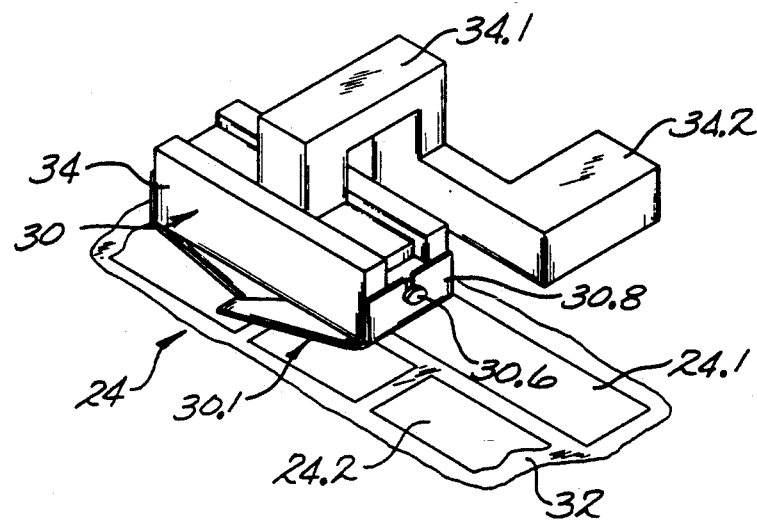
FIG. 1a is a perspective view of a portion of the electrical contact system of the FIG. 1 sensing apparatus including a movable contact slider.
Figure 1B:
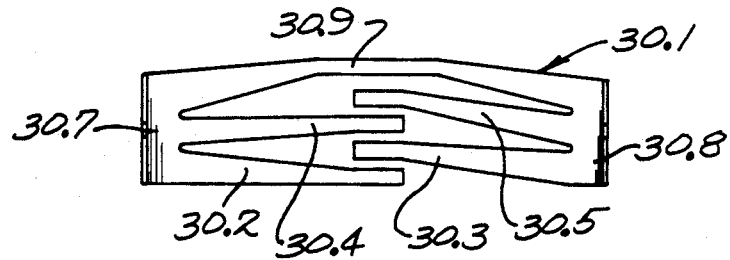
Figure 3:
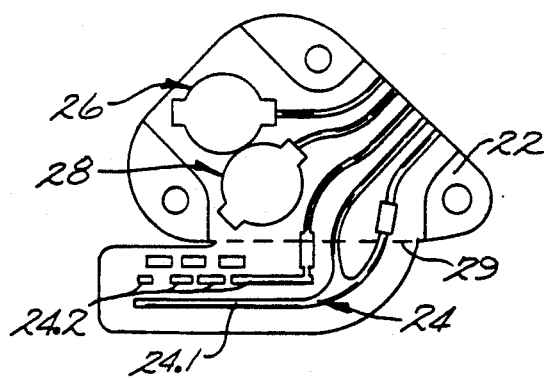
FIG. 3 is a bracket and circuit board used in the first embodiment.

With particular reference to FIG. 1 a portion of a vehicular automatic transmission housing 10 is shown with the oil pan removed. A manual valve body 12, which is part of the hydraulic control system, has a longitudinally, axially slidable valve member 14 formed with a slot or recess 16 which receives therein the pin 15.1 of a detent plate or manual lever 15. Valve member is attached to the gear selector and is movable therewith to control the various hydraulic passages associated with the gears. According to a first embodiment of the invention a sensing assembly 20 is mounted within the transmission housing 10 and is directly coupled to the manual valve member 14. Although various technologies can be employed to sense the position of the valve member including optical, magnetic, acoustic and the like, the preferred embodiments of the present invention make use of a sliding electrical contact system. Sensing assembly 20 comprises a bracket 22 affixed to the transmission housing by any suitable means such as bolts. Bracket 22 mounts thereon, as seen in FIGS. 1a, 1b and 3, an electrical contact system 24 and pressure switches 26, 28. Bracket 22 is bent approximately 90° along the dashed line 29 so that the pressure switches 26, 28 can be placed in communication with selected hydraulic passages while also providing a base for a sliding contact switch 30. It will be appreciated that the particular number of pressure switches employed is a matter of choice. Contact system 24 comprises a common contact strip 24.1 and a plurality of spaced contact segments 24.2 mounted on an electrically insulative carrier 32 mounted on bracket 22. Sliding contact switch 30 comprises a body 34 having an extension 34.1 with a distal free end 34.2 received in recess 16 of valve member 14. An electrical spring contact member 30.1 having a plurality of interdigitated contact fingers 30.2-30.5 is mounted on the bottom of body 34 by any conventional means such as screws 30.6 (one of which is shown in FIG. 1a). Contact member 30.1 has first and second end portions 30.7 and 30.8 with fingers 30.2 and 30.4 extending from end portion 30.7 toward end portion 30.8 and contact fingers 30.3 and 30.5 extending from end portion 30.8 toward end portion 30.7 and leg 30.9 joining the first and second end portions. Fingers 30.2 and 30.3 are adapted to slide along contact segments 24.2 while fingers 30.4 and 30.5 slide along contact strip 24.1. The provision of two contact fingers extending in opposite directions for each switching connection enhances reliability by redundancy as well as balancing contact forces despite changes in inertia and the like.

Figure 2:
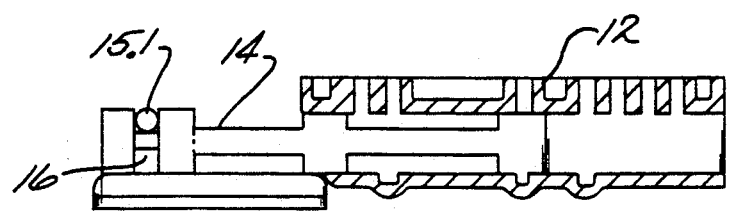
FIG. 2 is a cross sectional view of a typical manual valve.

As the manual valve member 14 is moved along the longitudinal axis as seen in FIG. 2, body 34, connected to valve member 14 via extension 34.1 which extends through slot 36.2 in wall 36.1 of housing 36, is caused to slide within housing 36 in a direction between opposed slide ends of the body with spring contact member 30.1 interconnecting contact strip 24.1 with one of the plurality of contact segments 24.2 depending upon the position of body 34.

Figures 5, 6:
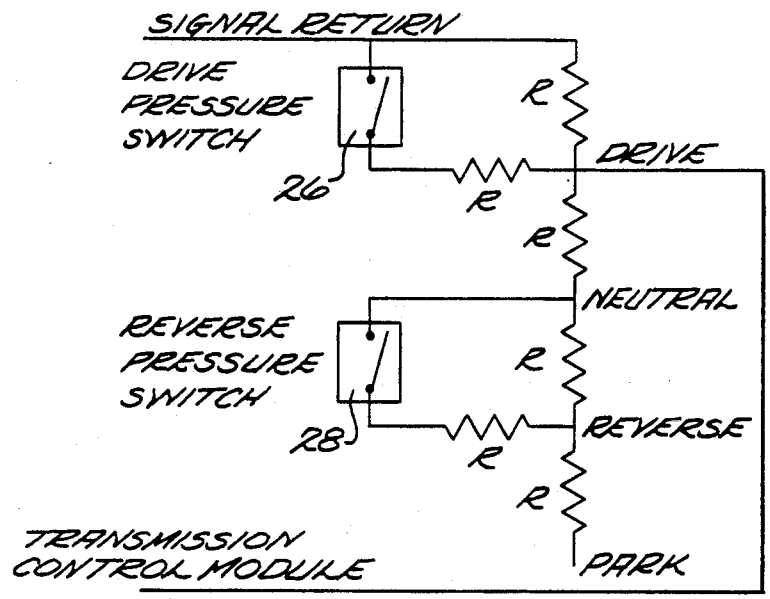
FIG. 5 is a schematic resistance network useful in the first embodiment.
FIG. 6 is a schematic chart showing manual valve position and pressure application versus resistance.

As seen in FIGS. 5 and 6, a resistive network is interconnected with the contact system so that for any selected axial position of valve member 14 a particular resistance level is provided. Further, as shown in FIG. 5, pressure switches 26, 28 are interconnected with selected resistances to provide an additional function relating to the application of pressure in the hydraulic system upon selection of a particular gear. As shown, pressure switch 26 provides an indication when the drive hydraulic passage has been pressurized and pressure switch 28 provides an indication when the reverse hydraulic passage has been pressurized, i.e., when these events have occurred.

Figure 4:
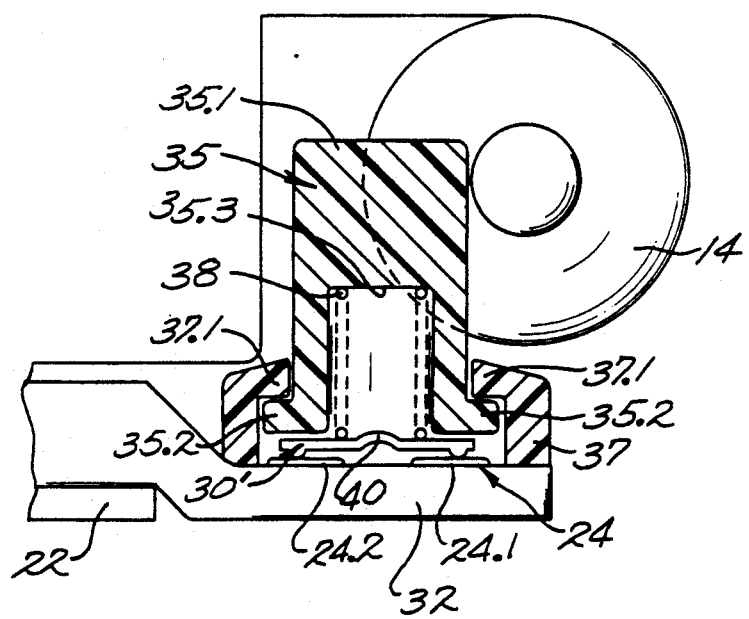
FIG. 4 is a cross sectional view of a slider and contact assembly useful in the first embodiment.

An alternative contact switch 30' is shown in FIG. 4 in which body 35 has outwardly, laterally extending flanges 35.2 on two opposite sides of the bottom portion of body 35 which interfit with inwardly extending flange 37.1 of switch housing 37 to retain body 35 in operative relation with carrier 32. Body 35 is provided with a recessed portion 35.3 which receives therein a conventional spring member 38 which places a downward bias on bridging contact element 40.

As the manual valve member 14 is moved along its longitudinal axis body 35 is caused to slide along the width of housing 37 with the bridging contact element 40, movable with body 35, making bridging electrical engagement between common contact 24.1 and a selected one of the contact segments 24.2.

Figure 9:
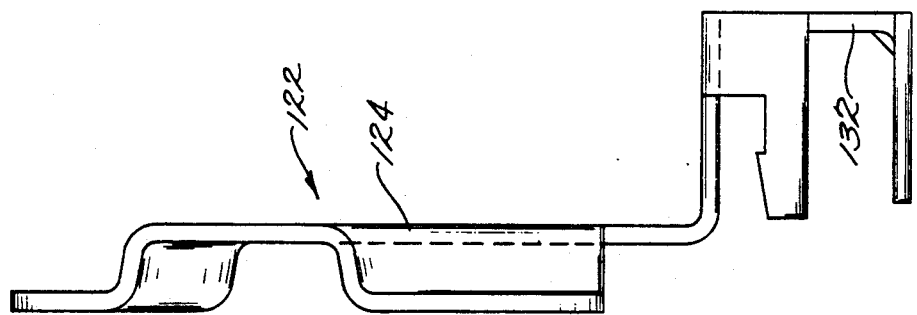
FIGS. 8 and 9 are front and side views respectively of a bracket used in the second embodiment of the invention.
Figure 8:
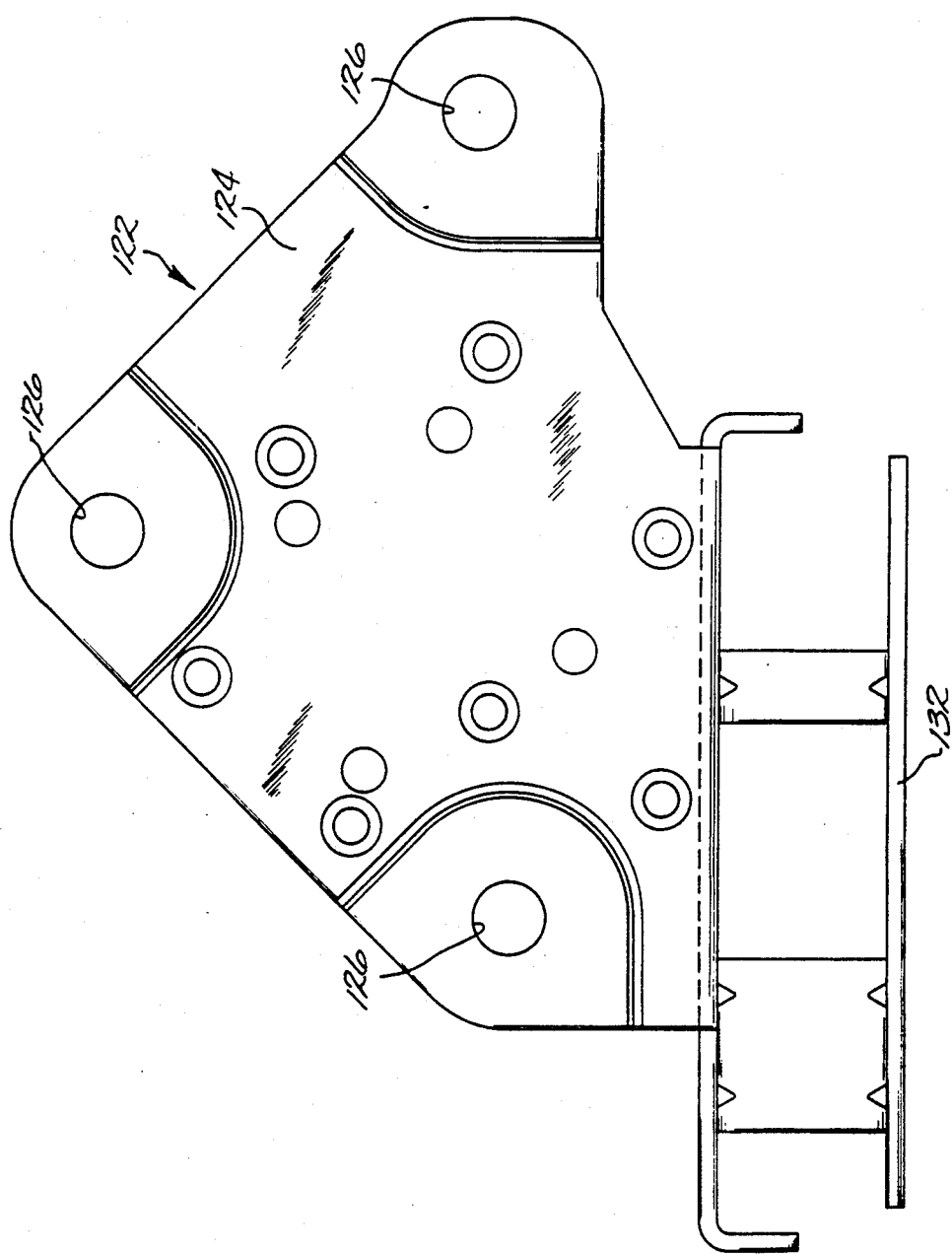
Figure 10:
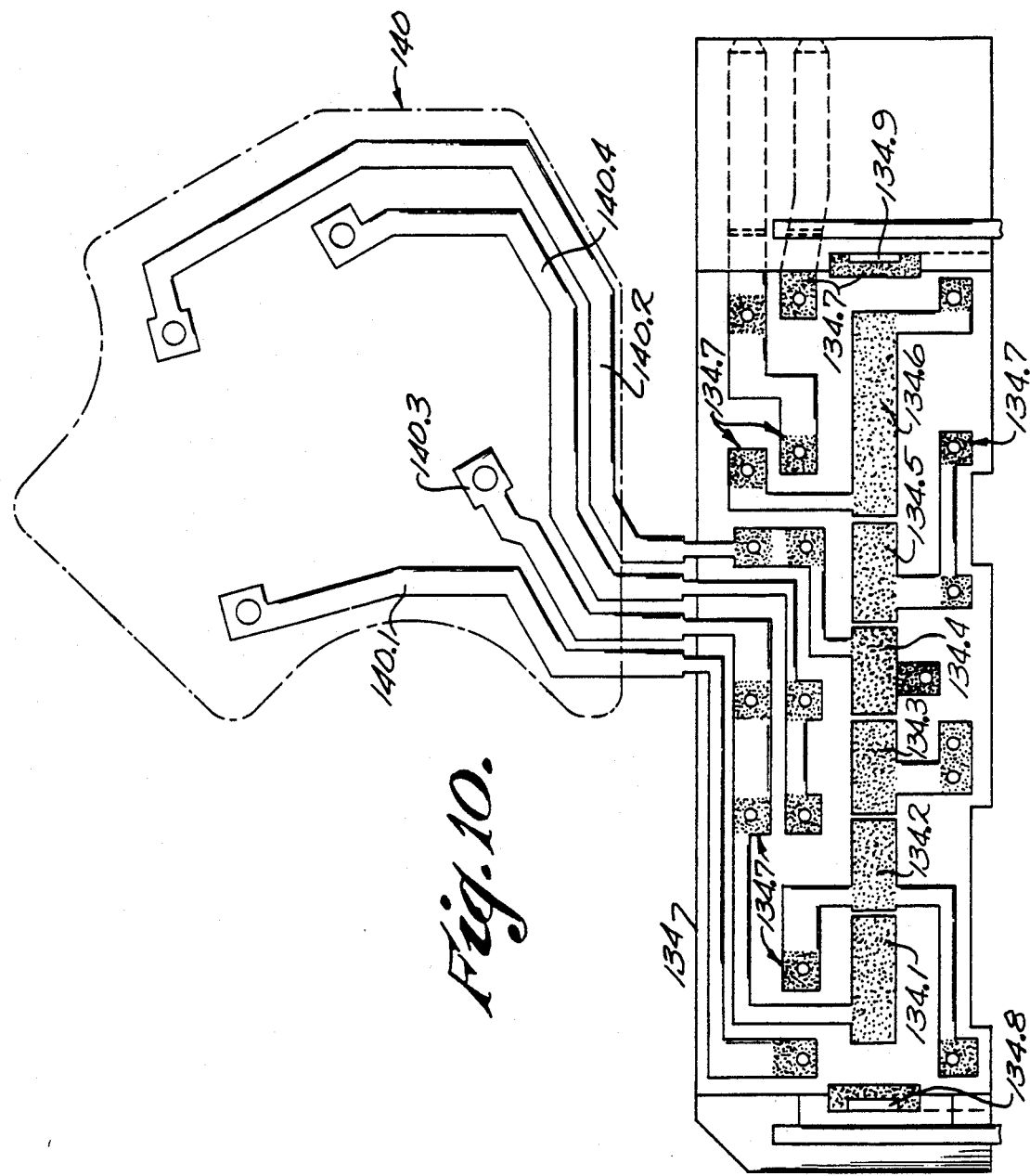
FIG. 10 is a top plan view of the circuit board before overmolding and bending into its final configuration.
Figure 11:
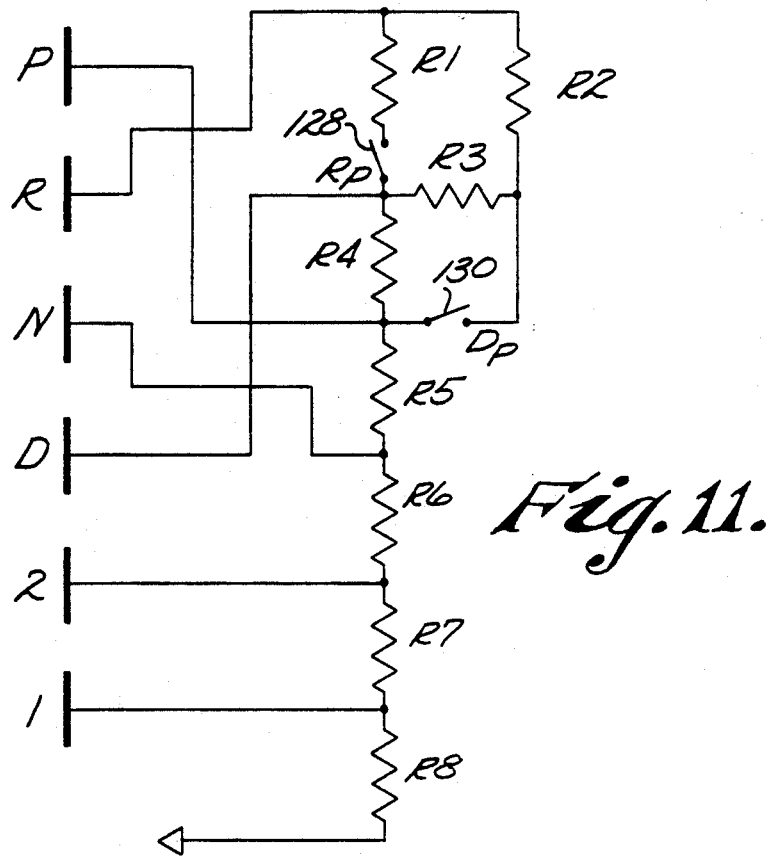
FIG. 11 is a schematic representation of a resistance network used with the second embodiment.

In accordance with a second embodiment of the invention, with reference to FIGS. 7-9, sensor assembly 120 comprises a bracket 122 of suitable material such as steel, having a first relatively flat portion 124 formed with mounting holes 126 and mounting thereon pressure switches 128, 130 to be discussed in greater detail below. A second portion 132 of bracket 122 mounts a sliding contact system to be discussed below. For purposes of reliability and cost effectiveness the stationary contacts of the sliding contact system and the interconnection network traces are made in one piece eliminating otherwise required joining points. As seen in FIG. 10 a circuit board 134 is provided as by overmolding a lead frame formed of suitable material, such as nickel plated brass, leaving exposed contact segments 134.1-134.6 and interconnection areas 134.7 shown as stippled. Also overmolded are leads 140.1-140.4 on portion 140 which is adapted to be received on portion 124 of bracket 122. A series of electrical resistors R-1-R8, shown in FIG. 11, are attached to the reverse side of board 134 on interconnections 134.7. A bar 142 of electrically conductive material, such as nickel plated brass, having distal leg portions 142.1, 142.2 respectively is received on bracket portion 132 with leg portions 142.1, 142.2 received in apertures 134.8, 134.9 respectively and in electrical connection with appropriate interconnection areas 134.7. The central portion of bar 142 is spaced from and parallel with the contact segments which are aligned along a straight line.

Figure 12:
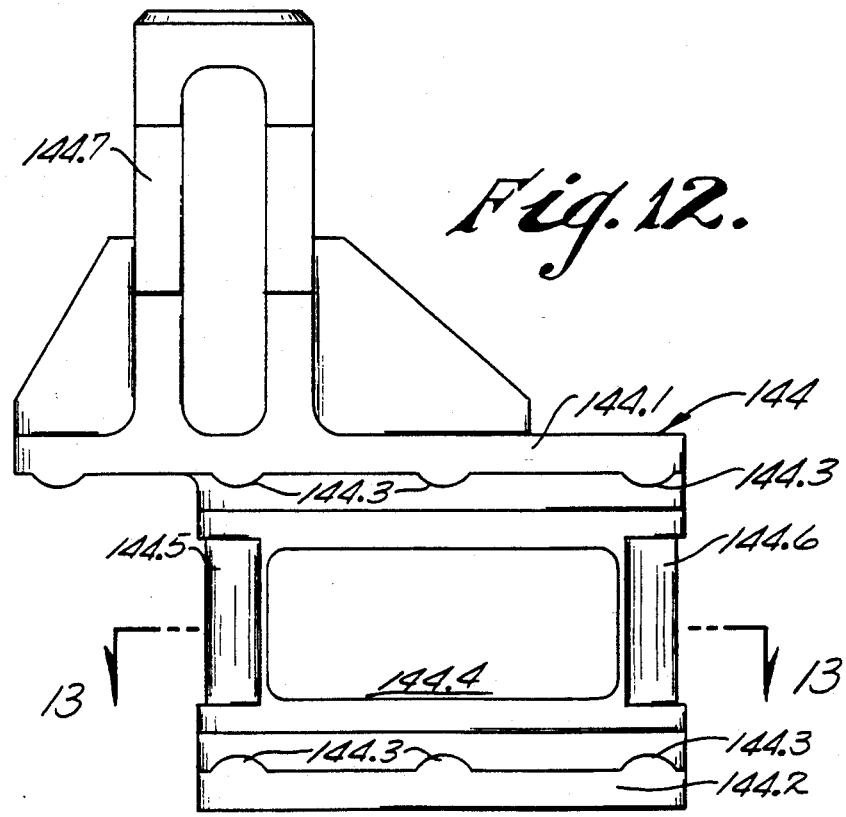
FIG. 12 is a bottom view of a slider used in the second embodiment.

A slider 144 (see FIG. 12) has generally parallel extending guide walls 144.1, 144.2, with vertically extending ribs 144.3 preferably having smooth rounded surfaces, are joined by frame portion 144.4.

Figure 13:
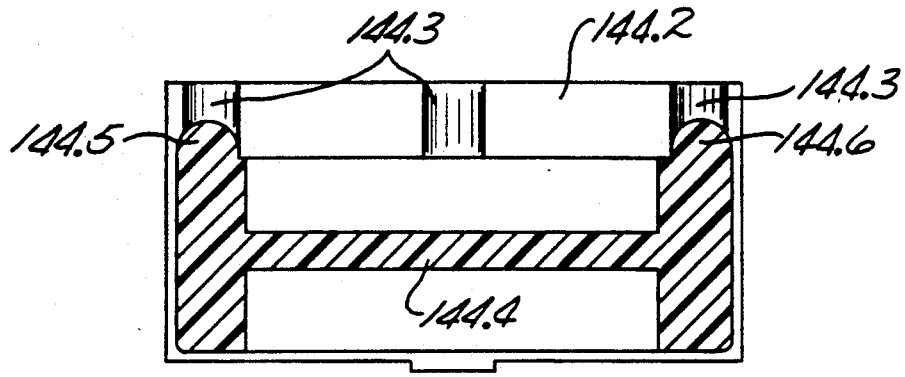
FIG. 13 is a cross section taken on line 13—13 of FIG. 12.
Figure 14:
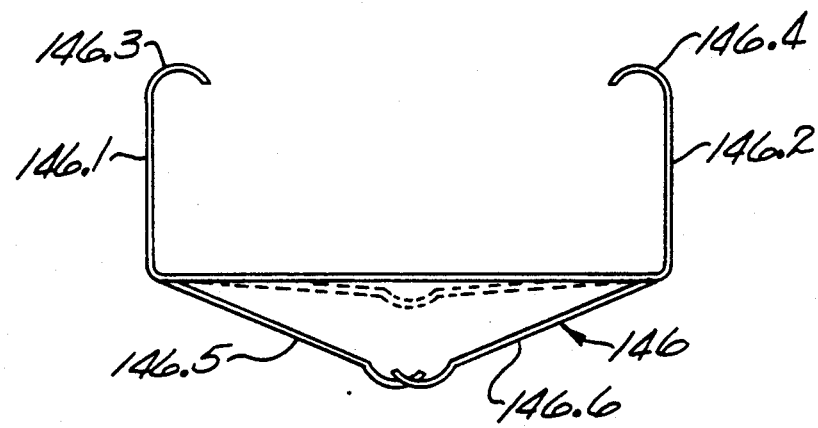
FIGS. 14 and 15 are front and bottom views respectively of an electrical spring contact which is received on the FIGS. 12, 13 slider.
Figure 15:
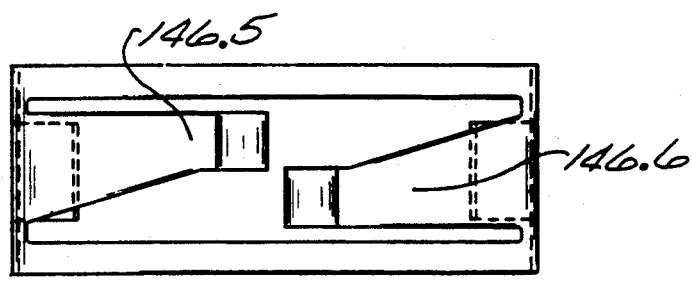

First and second spring anchor seats 144.5, 144.6 receive thereon a generally U-shaped contact spring 146 (see FIGS. 14, 15) formed of suitable material such as nickel plated CDA 521. Spring 146 has first and second legs 146.1, 146.2 respectively formed with curved portions 146.3, 146.4 at their distal end portions which are adapted to be received on respective spring anchor seats 144.5, 144.6 with first and second spring contact strips 146.5, 146.6 formed from the bight portion of the U-shaped spring disposed on the bottom of slide 144 as viewed in FIG. 13. The contact strips extend in opposite directions from one leg toward the other leg and have curved free contact end portions disposed approximately at the center of the bight portion and, as seen in FIG. 15 are laterally spaced from one another having one edge of each lying essentially on a line through the center of spring 146 along its length.

Figure 17:
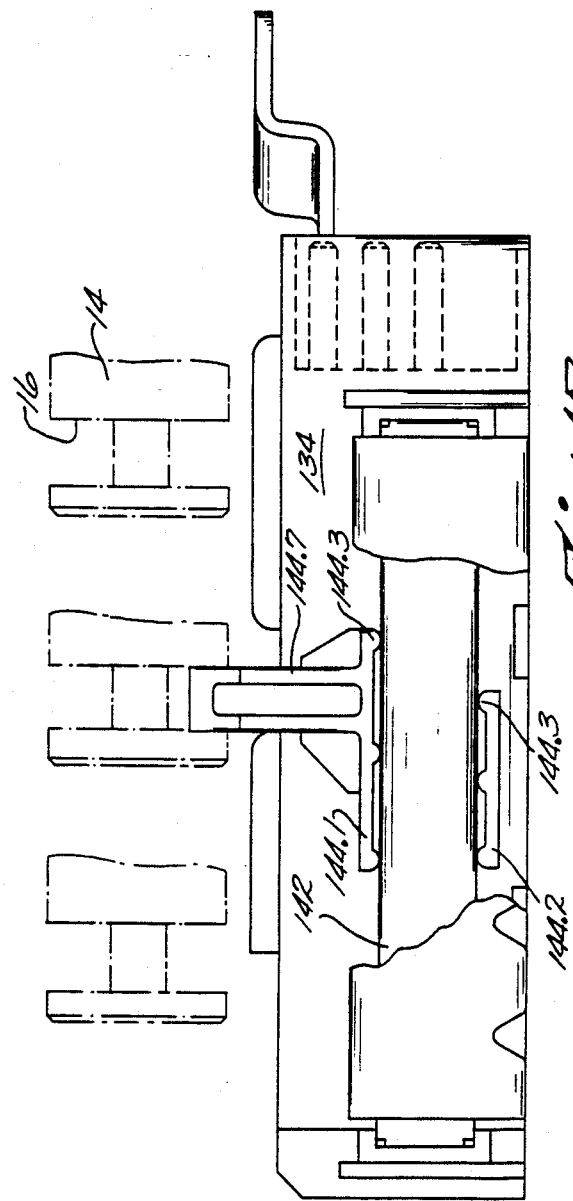
FIG. 17 is a top view of the FIG. 7 sensing apparatus.

An arm 144.7 extends laterally from slider 144 and is adapted to be received in a recess 16 in the manual valve member 14 as best seen in FIGS. 17 and 18. Slider 144 is disposed between circuit board 134 and bar 142 and is adapted to slide therebetween depending upon the position of manual valve member 14 with the curved free distal end of spring legs 146.5, 146.6 sliding on contact segments 134.1–134.6 and curved portions 146.3, 146.4 in continuous engagement with bar 142.

Figure 16:
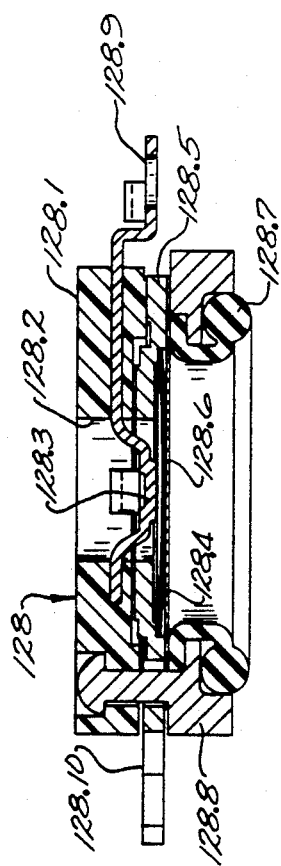
FIG. 16 is a cross sectional view taken through a pressure switch used in the above embodiments of the invention.

Pressure switches 128, 130 may be of the type shown in FIG. 16. Although the following description is for switch 128 it will be appreciated that it also applies to switch 130. An electrically insulative upper body 128.1 has a centrally located aperture 128.2 in which is disposed a center electrical contact 128.3 and an electrically conductive snap acting disc 128.4 is seated in an electrically conductive annular retainer 128.5 and held in its seat by a flexible membrane 128.6. An o-ring type gasket 128.7 is attached to switch 128 by a lower body 128.8 which is connected to upper body 128.1 sandwiching the several parts together. A connector 128.9 integrally attached to center contact 128.3 and a connector 128.10 integrally attached to retainer 128.5 serve both to mount the pressure switch to bracket 122 and to make electrical connection with leads 140.1–140.4 (FIG. 10). In operation, membrane 128.6 is placed in communication with a pressure source, i.e., the hydraulic fluid in a selected passage. When sufficient pressure is exerted on membrane 128.6 it will deflect inwardly causing disc 128.4 to snap into engagement with contact 128.3 thereby closing a circuit between connectors 128.9 and 128.10.

As seen in FIG. 18, bracket portion 124, with pressure switches 128, 130 (only one of which is shown in the Figure) is mounted on the transmission housing 10 between the housing 10 and the oil filter 2 with bracket portion 132 disposed in the space below oil filter 2 and within the oil pan so that the sensing apparatus is inundated in oil. The oil acts as a lubricant for the slider mechanism, however, materials chosen for the sensing assembly need to be selected with are not adversely chemically affected by the oil and its contaminants. In a device made in accordance with the FIGS. 7–18 embodiment the following resistor values were employed:

| |
|---|
| $R1 = 634$ ohm |
| $R2 = 976$ ohm |
| $R3 = 200$ ohm |
| $R4 = 243$ ohm |
| $R5 = 80.6$ ohm |
| $R6 = 60.4$ ohm |
| $R7 = 49.9$ ohm |
| $R8 = 90.0$ ohm |

FIGS. 19 and 20 show a portion of a modified sensor assembly 200 having a slider 202 with a detent 204 formed in the slider. An orientation or reference projection 206 is mounted on a circuit board 208 having spaced contact segments 210 on a surface thereof. Arm 212 is adapted to be received in recess 16 of manual valve member 14 and, with projection 206 received in detent 204 the sensing assembly is affixed to the transmission housing to ensure the orientation of the contact segments 210 properly relate to the position of the manual valve. Preferably projection 206 is adapted for movement toward and away from contact segments 210 as shown by arrow 214 so that after securing the assembly to the transmission the projection can be moved away from the motion of the slider. A groove 216 is formed on top of slider 202 to receive therein a common bar 218, the left hand portion of which as viewed in the figure being broken away for purpose of illustration, to guide movement of the slider and to make electrical engagement with one end of U-shaped spring 220, the other end of which is biased against the strip of contact segments 210.

The system of the present invention not only provides indication of the transmission mode through the position of the manual valve member ti also provides a feedback to indicate when an hydraulic even has occurred by means of the pressure switch signals. This results in several advantages. Initial shift engagement (i.e. garage shift) can be improved because increased system pressure can be maintained only as long as necessary, viz until the particular clutch hydraulic circuit is filled. Once the switching pressure of the pressure switch is attained when the circuit is filled the pressure switch signals the powertrain controller to moderate the applied pressure to prevent a harsh shift engagement. This use of a closed-loop pressure control will accommodate variations in pump output due to engine speed changes, temperature variations affecting viscosity, and the like. Further, by means of the system it is possible to detect when pressure is applied to reverse and forward hydraulic circuit sat the same time indicating a so called rock cycle and in response to this indication the hydraulic system pressure can be increased to thereby prevent overheating of friction material and prevention of delamination or debonding. Another feature the system can provide is fault indication. If the pressure which should increase to a predetermined level when the manual valve member is moved to a given position is not sufficient to close a pressure switch a selected time after the manual valve member has moved then a signal can be generated to go into a default mode or to light a warning light. If desired, a third pressure switch could be employed to monitor control pressure for even more reliable fault detection. For example, control pressure can be compared to clutch pressure to ensure proper operation has been effected.

Prior art garage shift enhancement schemes have used timed pressure control in an open-loop mode. Such schemes have inherent short comings because pump output can vary with engine speed, pump component tolerances result in variations and fluid viscosity can change. The use of pressure switches for closed-loop pressure control in accordance with the invention eliminates all of the aforementioned variables.

It will be apparent to those skilled in the art that variations on the structure described can be made to accomplish essentially the same purpose. All such variations within the scope of the claims are intended to be within the scope and the spirit of the present invention.

We claim:

1. Motor vehicle transmission mode sensing apparatus for use in a transmission having a manual valve means, the manual valve means having a valve member movable among selected gear positions comprising a bracket having first and second portions, the first portion having mounting means for mounting the bracket to the transmission adjacent the manual valve means, the second portion having a plurality of stationary, spaced contact segments, one for each gear position to be sensed, and slider means having a movable contact slidably mounted on the second portion, biasing means urging the movable contact against the second portion, the slider means having a projection extending into the recess of the valve member when the bracket is mounted to the transmission coupling the slider means and valve member whereby the slider will move with the valve member with the movable contact engaging a respective stationary contact segment in dependence upon the position of the slider means.

2. Motor vehicle transmission mode sensing apparatus according to claim 1 in which the stationary, spaced contact segments extend in a straight line.

3. Motor vehicle transmission mode sensing apparatus according to claim 1 in which pressure switch means are mounted on the first bracket portion, the pressure switch means having pressure sensing membranes being adapted for placement in communication with selected hydraulic circuit passages of the transmission.

4. Motor vehicle transmission mode sensing apparatus according to claim 3 in which the pressure switch means comprise at least one switch having a snap acting disc.

5. Motor vehicle transmission mode sensing apparatus according to claim 1 further including an electrical resistance network interconnected with the stationary contact segments in which a different resistance value is connected to each stationary contact segment corresponding to a gear position to provide electronic signals connectable to an electronic powertrain controller when the movable contact engages respective stationary contact segments.

6. Motor vehicle transmission mode sensing apparatus according to claim 5 in which pressure switch means are mounted on the first bracket portion, the pressure switch means being adapted for placement in communication with a selected hydraulic circuit of the transmission, the pressure switch means including an electrical circuit connected to shunt selected resistors in the resistance network, the pressure switch means having pressure sensing membranes adapted to switch electrical contacts between open and closed states dependent upon the pressure level of the selected hydraulic circuit.

7. Motor vehicle transmission mode sensing apparatus according to claim 2 in which a common contact segment is disposed on the second bracket portion extending in parallel relation with the plurality of stationary contact segments also disposed on the second bracket portion, the slider means being slidable along the common contact segment, the movable contact comprising a bridging contact element extending from the common contact and adapted upon transverse sliding movement to in turn engage each of the stationary contact segments at a selected position.

8. Motor vehicle transmission mode sensing apparatus according to claim 2 in which the slider means has respective first and second opposite sides, an electrically conductive member is mounted on the first side of the slider means and is electrically connected to common, a generally U-shaped electrically conductive spring member having first and second legs, one leg disposed on the first side of the slider means in engagement with the electrically conductive member and the second leg disposed on the second side of the slider means engageable with selected stationary contact segments upon sliding movement of the slider means.

9. Motor vehicle transmission mode sensing apparatus according to claim 1 in which the mounting means includes means to adjust the transverse position of the bracket relative to the manual valve and further including indexing means comprising one of a detent and an index projection formed in the slider means and the other of the detent and the index projection formed on the second bracket portion as a reference whereby the bracket can be mounted to the transmission with the projection of the slider received in the recess of the valve member and with the movable contact in registration with a selected stationary contact segment.

10. Motor vehicle transmission mode sensing apparatus comprising a bracket having first and second portions, the first portion having mounting means for mounting the bracket in a transmission housing, the second portion mounting a circuit board including a plurality of stationary contact segments on a flat surface arranged along a straight line, a movable contact assembly comprising an electrically conductive bar mounted on the bracket and having a central portion spaced from and extending parallel with the straight line, a slider having a body and an arm projecting therefrom, the arm having a free distal end adapted to be received in a recess formed in a manual valve of a transmission and movable therewith when the bracket is mounted in the transmission housing, the body of the slider disposed between the flat surface and the central portion of the bar, the slider being movable along the straight line, and a resilient electrical contact mounted on the slider having a portion in continuous engagement with the bar and another portion resiliently biased into engagement with the flat surface, the resilient electrical contact engaging a respective stationary contact segment in dependence upon the position of the slider.

11. Motor vehicle transmission mode sensing apparatus according to claim 10 in which the slider body has first and second opposite sides and in which the resilient electrical contact is a generally U-shaped member having first and second legs joined by a bight portion, the first and second legs having a curved free distal end, the bight portion having a contact strip extending therefrom, the slider body being disposed between the first and second legs of the U-shaped member with the free distal ends received on the first opposite side and the bight received on the second opposite side.

12. Motor vehicle transmission mode sensing apparatus according to claim 11 in which the bight portion of the U-shaped member is formed with first and second contact strips extending in opposite directions respectively from one of the first and second legs toward the other of the first and second legs to a point generally at a center of the bight portion.

13. Motor vehicle transmission mode sensing apparatus according to claim 10 further including pressure sensing switches mounted on the first bracket portion and electrically interconnected with the stationary contact segments.

14. Motor vehicle transmission mode sensing apparatus according to claim 10 in which the body of the slider is formed with spaced wall portions and the bar is received between the wall portions.

15. Motor vehicle transmission mode sensing apparatus for use in a transmission having a manual valve means, the manual valve means having a valve member movable among selected gear positions comprising a bracket having first and second portions, the first portion having mounting means adapted to attach the bracket to the transmission adjacent the manual valve means, the second portion having a plurality of spaced contact segments, one for each gear position to be sensed and a common contact strip, means to mount the contact segments and the common contact strip on the second portion of the bracket, movable means interconnecting the valve member, when the bracket is mounted to the transmission, to a movable electrical contact electrically connected to the common contact strip to electrically connect a preselected contact segment and the common contact strip dependent upon the position of the valve member.

16. Motor vehicle transmission mode sensing apparatus according to claim 15 in which pressure switch means are mounted on the first bracket portion, the pressure switch means having pressure sensing membranes being adapted for placement in communication with selected hydraulic circuit passages of the transmission.

17. Motor vehicle transmission mode sensing apparatus according to claim 15 in which the contact segments and the contact strip are stationary and the movable means connected to the valve member includes a resilient electrically conductive member having a portion biased into engagement with the common contact strip and another portion engageable with a selected contact segment.

18. In a motor vehicle having a transmission and a manual valve member movable among a plurality of gear positions in communication with respective hydraulic circuits for controlling the selection of gears including drive, reverse and park, a mode sensing and feedback system comprising bracket means, means for mounting the bracket means adjacent the manual valve member, first and second pressure switch means mounted on the bracket means in communication with the drive and reverse hydraulic circuits respectively, a plurality of electrical contact segments, one for each gear position a common contact strip, a two wire resistive network means coupled to the first and second pressure switch means and to the plurality of contact segments and contact strip and movable means coupled to the manual valve member and having a movable contact electrically connected to the common contact strip and being movable into and out of engagement with the plurality of electrical contact segments electrically connecting the common contact strip with a selected contact segment dependent upon the position of the manual valve member whereby an output signal is generated which varies with the selected position of the manual valve member and with the pressure of the hydraulic circuits in communication with the pressure switch means.

19. In a motor vehicle having a transmission and a manual valve member movable among a plurality of gear positions in communication with respective hydraulic circuits for controlling the selection of gears including drive, reverse and park, a mode sensing and feedback system comprising bracket means, means for mounting the bracket means adjacent the manual valve member, pressure switch means mounted on the bracket means in communication with a selected hydraulic circuit, a plurality of electrical contact segments, one for each gear position, a common contact strip, a two wire resistive network means coupled to the pressure switch means and to the plurality of contact segments and contact strip and movable means coupled to the manual valve member and having a movable contact electrically connected to common contact strip and being movable into and out of engagement with the plurality of electrical contact segments electrically connecting the common contact strip with a selected contact segment dependent upon the position of the manual valve member whereby an output signal is generated which varies with the selected position of the manual valve member and with the pressure of the hydraulic circuit in communication with the pressure switch means.

20. Motor vehicle transportation mode sensing apparatus for use in a transmission having a manual valve means, the manual valve means having a valve member movable along selected gear positions comprising first and second bracket portions, the first portion having mounting means for mounting the bracket to the transmission adjacent the manual valve means, the second portion having a plurality of spaced stationary circuit portions, one for each gear position to be sensed, and slider means having a movable circuit portion slidably mounted on the second bracket portion and slidable sequentially into and out of electrical engagement with the respective spaced circuit portions, the slider means having a projection extending into the recess of the valve member coupling the slider means and valve member whereby the slider will move with the valve member.

21. Motor vehicle transportation mode sensing apparatus according to claim 20 in which the stationary, spaced contact segments extend in a straight line.

22. Motor vehicle transmission mode sensing apparatus according to claim 20 in which pressure switch means are mounted on the first bracket portion, the pressure switch means having pressure sensing membranes being adapted for placement in communication with selected hydraulic circuit passages of the transmission.

23. Motor vehicle transmission mode sensing apparatus according to claim 22 in which the pressure switch means comprise at least one switch having a snap acting disc.

24. In a motor vehicle having a transmission and a manual valve member movable among a plurality of gear positions in communication with respective hydraulic circuits for controlling the selection of gears including drive, reverse and park, a mode sensing and feedback system comprising pressure switch means mounted in communication with an hydraulic circuit, a plurality of electrical circuit portions each having a stationary contact, one for each gear position, slidable electrical contact means connected to the manual valve and being movable therewith sequentially among the stationary contacts to energize a respective electrical circuit portion dependent upon the position of the manual valve, and a resistive network means coupled to the pressure switch means and to the plurality of circuit portions, each electrical circuit portion having a different resistance value, and the pressure switch means shunting selected portions of the resistive network means upon actuation of the pressure switch means whereby an output signal is generated which varies with the selected position of the manual valve member and with the pressure of the hydraulic circuits in communication with the pressure switch means.

* * * * *